July 12, 1966 H. T. FINCH 3,260,787

TRANSISTOR HEAT DISSIPATORS

Filed Dec. 20, 1962 2 Sheets-Sheet 1

INVENTOR.
HORACE T. FINCH

BY R. E. Geauque

ATTORNEY

July 12, 1966 H. T. FINCH 3,260,787

TRANSISTOR HEAT DISSIPATORS

Filed Dec. 20, 1962 2 Sheets-Sheet 2

INVENTOR.
HORACE T. FINCH

BY R. E. Geangue

ATTORNEY

United States Patent Office 3,260,787
Patented July 12, 1966

3,260,787
TRANSISTOR HEAT DISSIPATORS
Horace T. Finch, Arcadia, Calif., assignor to The Birtcher Corporation, Los Angeles, Calif., a corporation of California
Filed Dec. 20, 1962, Ser. No. 246,173
4 Claims. (Cl. 174—15)

The present invention relates to transistor heat dissipators and a method of manufacturing same and more particularly to transistor heat dissipators of the finned type.

It has long been a problem to obtain accuracy and dependability in electronic components operated under a wide range of environmental conditions. This problem has been accentuated in recent years with the development of highly complex electronic systems. Temperature variation and shock and vibration conditions are often extreme, resulting in variations in the predicted operating characteristics. A relatively slight inaccuracy of an electronic component in a complex system may cause complete failure of the entire system when the data obtainable is critical.

With particular reference to transistors, one of the problems has been the proper dissipation of heat which is generated while the transistors are functioning. Heat dissipators of various types have been employed to solve this problem. One of these types has a central core with fins extending radially therefrom and may be referred to generally as "finned-type dissipators." Prior art methods of manufacturing finned-type dissipators include extruding gear-shaped members and brazing individual fins to a cylindrical core. These two methods are relatively expensive resulting in a cost problem in connection with the finished product. Also, the extruded gear-shaped members have an undesirable area-to-weight ratio.

Another problem found in connection with finned-type heat dissipators for transistors resides in the fact that some of them do not afford efficient protection against damage to transistors due to vibration.

An additional problem is encountered in connection with transistors which are secured to a metal chassis. In such a mounting, the heat must be dissipated from the small base area of the component by conduction to the metal chassis. Also, in some instances, dielectric sockets are mounted in the chassis to receive the transistors. As is apparent, the presence of the dielectric sockets substantially reduces the heat dissipation from the base of the transistor to the metal plate since the sockets have a low thermal conductivity and present a thermal barrier.

A still further problem resides in the difficulty of manufacturing a finned-type heat dissipator having elements which are usable with transistors of a number of different diameters.

In view of the foregoing factors and conditions characteristic of finned-type heat dissipators, it is a primary object of the present invention to provide a new and improved heat dissipator not subject to the disadvantages enumerated above and having a construction of a type which may be manufactured efficiently, expeditiously and economically.

Another object of the invention is to provide an improved method of manufacturing finned-type transistor heat dissipators.

Yet another object of the present invention is to provide a heat dissipating device having a base portion in contact with an electrical component and a finned heat dissipating portion extending away from the component.

A further object of the invention is to provide a heat dissipating device having a portion in contact with an electrical component such as a transistor, to remove heat by conduction and having another portion with fins for dissipating heat removed from the electrical component by radiation.

According to the present invention, a finned-type transistor heat dissipator is constructed of a material, such as copper, silver or aluminum, having good heat conduction properties so that heat is conducted from the base of the transistor to the radiating fins and is dissipated from the conducting structure by radiation and conduction. A single sheet of material is folded in accordance with a predetermined pattern to inexpensively manufacture a finned-type dissipator. A central cavity is provided with a spring action so that the heat dissipator will accommodate a range of diameters of transistors.

The features of the present invention which are believed to be novel are set forth with particularity in the appended claims. The present invention, both as to its organization and method of manufacture, together with further objects and advantages thereof, may best be understood by reference to the following description, taken in connection with the accompanying drawings in which:

Figure 1:
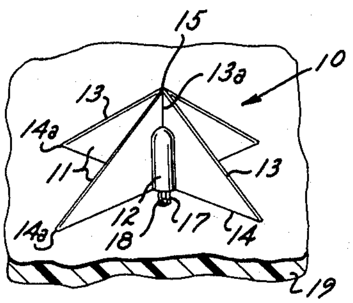
FIGURE 1 is a perspective view of a heat dissipator of the invention and its associated mounting plate or chassis.
Figure 2:
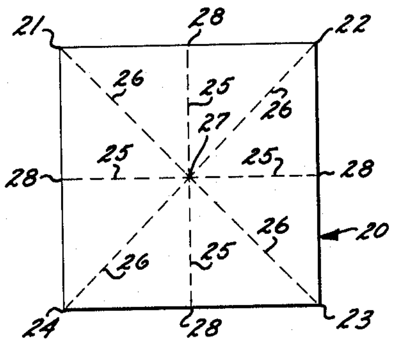
FIGURE 2 is a plan view of a sheet of material used to form the heat dissipators of the invention.

Referring again to the drawings and particularly to FIGURES 1–6, a finned-type heat dissipator constituting one embodiment of the present invention, generally designated 10, includes a plurality of fins 11 and a central cylindrical cavity 12. Each fin 11 has an outer edge 13, an inner edge $13_a$, a base portion 14, and lower tips $14_a$. The outer edges 13 and the inner edges $13_a$ converge into a common upper tip 15 forming the top of the dissipator 10. The cavity 12 encompasses a transistor 16 (FIGURE 6) which includes leads 17 extending through an aperture 18 in a mounting panel or chassis 19.

Figure 3:
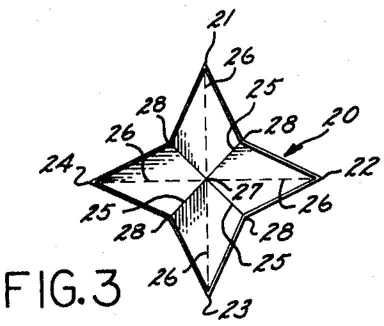
FIGURE 3 is a plan view of the sheet of material shown in FIGURE 1 at one stage during the formation of a finned-type heat dissipator.
Figure 4:
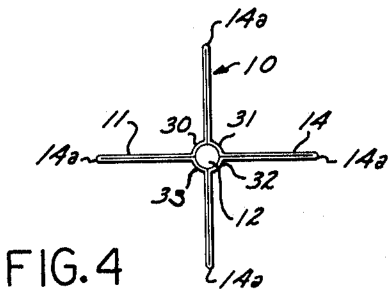
FIGURE 4 is a plan view of the sheet of FIGURE 1 after the final forming steps have been performed thereon.
Figure 5:
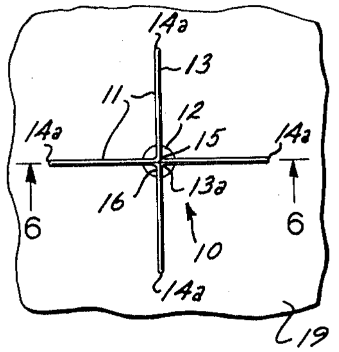
FIGURE 5 is a plan view of the heat dissipator of FIGURE 1.
Figure 6:
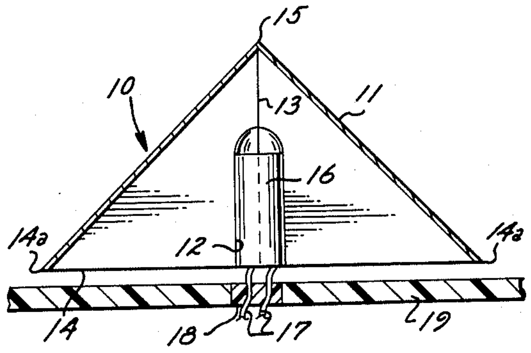
FIGURE 6 is a cross-sectional view taken along line 6—6 of FIGURE 5.

The dissipator 10 is formed from a single, square sheet of material 20 having corners 21, 22, 23 and 24, respectively. The sheet 20 is folded upon broken lines 25 and 26 in such a manner that the broken lines 26 become the outer edges 13 and the broken lines 25 become the inner edges $13_a$. The center point of the sheet 20, identified by the numeral 27, becomes the common tip 15. The folding operation is accomplished by bringing the mid portions of the four peripheral edges 28 of sheet 20 uniformly upwardly and inwardly toward point 27 until the lines 25 meet along a common vertical axis. FIGURE 3 shows the sheet 20 at an intermediate stage of the forming operation wherein the edges 28 have been pushed inwardly and upwardly approximately one-half the distance from their initial to their final positions. At this time, a mandrel having a configuration and shape approximating that of cavity 12 may be suspended over point 27 in such a manner that the cavity 12 will be formed when the edges 28 are pressed inwardly around the mandrel, not shown. This is a simple forming operation which results in the heat dissipator 10 wherein the edges 28 of material 20 form the bottom portion 14 of each fin 11 with the corners 21–24 forming a respective tip $14_a$.

It is to be noted that cavity 12 is formed with segments 30, 31, 32, and 33 (FIGURE 4) which are unconnected so that they form a resilient clip which will accommodate a range of diameters of transistors 16. When leads 17 are brought through aperture 18 and connected in a circuit, the base 14 of dissipater 10 is drawn into engagement with the chassis 19. In this position, the fins 11 of heat dissipator 10 readily radiate heat away from transistor 16.

Figure 7:
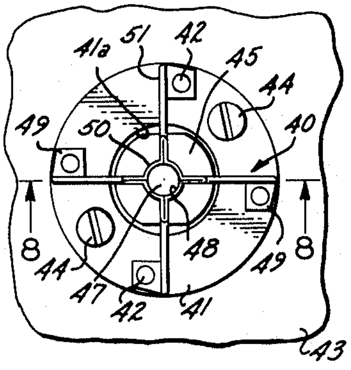
FIGURE 7 is a plan view of another embodiment of the invention.
Figure 8:
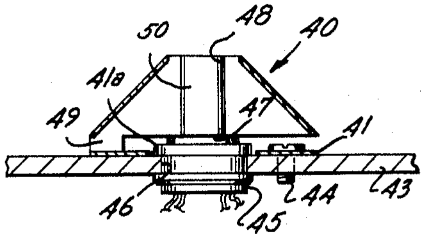
FIGURE 8 is a cross-sectional view taken along line 8—8 of FIGURE 7.
Figure 9:
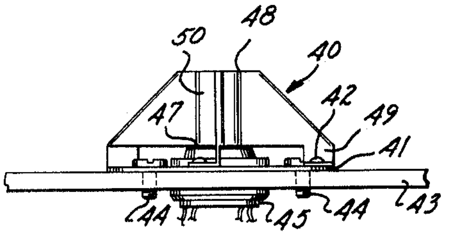
FIGURE 9 is an elevational view of the device of FIGURE 7.

Referring now to FIGURES 7–9, a second embodiment of the present invention is shown wherein a heat dissipator 40 is attached to a heat sink 41 by means of rivets 42. The heat sink 41 includes a control aperture $41_a$ and is attached to a metal chassis 43 by means of screws 44. An insulated receptacle 45 is mounted in an aperture 46 in chassis 43 and is adapted to receive the prongs, not shown, of a transistor 47.

The dissipator 40 is formed initially to be identical to the dissipator 10 shown in FIGURES 1–6. The dissipator 40 is then truncated to form an open top 48 and the base portion is cut away to form tabs 49 so that dissipator 40 may be mounted on heat sink 41 in spaced relation therewith to provide a path for the circulation of a cooling medium around the base of transistor 47 and upwardly along the walls of the transistor engaging portion 50 of dissipator 40. Heat is transmitted to the heat sink 41 and is radiated into the atmosphere by means of fins 51.

Figure 10:
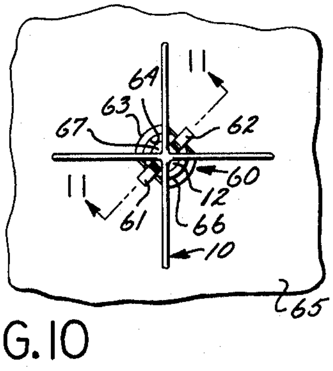
FIGURE 10 is a plan view of yet another embodiment of the invention.
Figure 11:
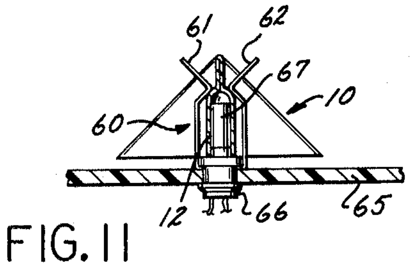
FIGURE 11 is a cross-sectional view taken along line 11—11 of FIGURE 10.

Referring now to FIGURES 10–11, a resilient clip 60 having upstanding legs 61 with crimped end portions 62 and a base portion 63 having a central aperture 64 is secured to a dielectric chassis 65 by means of an insulated socket 66. A transistor 67 has pins, not shown, engaging the socket 66 and extends upwardly intermediate the legs 61 of clip 60. A finned heat dissipator 10, identical in construction with that shown in FIGURES 1–6, is mounted on transistor 67 in such a manner that the crimped portions 62 of clip 60 engage the dissipator 10 at the upper extremity of cavity 12 to maintain the dissipator 10 in position on transistor 67 and to transmit heat from the base of socket 66 up to the heat dissipator 10.

Figure 12:
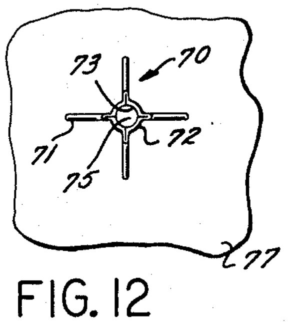
FIGURE 12 is a plan view of still another embodiment of the invention.
Figure 13:
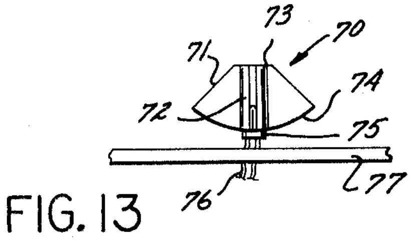
FIG. 13 is an elevational view of the device of FIGURE 12.

Referring now to FIGURES 12 and 13, yet another embodiment of the present invention comprises a heat dissipator 70 which is formed in a manner identical to that described in connection with the embodiment shown in FIGURES 1–6 to have fins 71 and a transistor receiving cavity 72. The dissipator 70 is then truncated to form an open top 73 and the base of the dissipator 70 is cut away on a pattern resulting in an arcuate base portion 74. A transistor 75 is then mounted in cavity 72 and the leads 76 of transistor 75 are brought through a suitable chassis 77. The arcuate base 74 and the open top 73 provide open areas to promote the circulation of a coolant about the base of transistor 75, up through cavity 72 and out the open top 73.

While the particular finned-type heat dissipators and method of making same herein shown and described in detail are fully capable of attaining the objects, and providing the advantages hereinbefore stated, it is to be understood that they are merely illustrative of the presently preferred embodiments of the invention and that no limitations are intended to the details of construction, design or manufacturing steps herein shown and described other than as defined in the appended claims.

What is claimed is:

1. A heat dissipating device for electrical circuit means comprising:
   - a thin metal sheet folded inwardly at a plurality of locations to form a plurality of spaced fins extending outwardly from a common vertical axis;
   - each of said fins comprising a pair of triangular shaped walls adjacent one another and having inner edges located at said vertical axis;
   - said walls being connected together at another edge and being separated at a third edge;
   - all of said connected edges meeting at a common tip;
   - said inner edges of said walls being deformed to jointly form a cavity for receiving said circuit means.

2. A heat dissipating device as defined in claim 1 wherein said cavity is spaced from said tip and is open at the end of said inner edges opposite said tip.

3. A heat dissipating device as defined in claim 2 having a base for supporting said circuit means, and clip means supported by said base and exteriorly engaging said cavity for retaining said dissipating device in position.

4. A heat dissipating device as defined in claim 2 having tab means on said third edges for attachment of said fins to a heat sink.

References Cited by the Examiner

UNITED STATES PATENTS

| | | | |
|---|---|---|---|
| D. 194,787 | 3/1963 | Chadwick. | |
| 1,550,154 | 8/1925 | Faccioli | 174—16 |
| 3,147,802 | 9/1964 | Katz | 174—16 X |
| 3,185,756 | 5/1965 | Allison | 174—35 |
| 3,195,628 | 7/1965 | McAdam | 317—234 X |

OTHER REFERENCES

Steigenberger: German ptd. application, No. 1,150,723, pub. 6/27/63.

LARAMIE E. ASKIN, *Primary Examiner.*

ROBERT K. SCHAEFER, *Examiner.*

J. F. RUGGIERO, *Assistant Examiner.*